United States Patent [19]
Hamstra

[11] 3,937,922
[45] Feb. 10, 1976

[54] CONTROL SYSTEM
[75] Inventor: David C. Hamstra, Clinton, Iowa
[73] Assignee: General Electric Company, Fort Wayne, Ind.
[22] Filed: Aug. 27, 1974
[21] Appl. No.: 500,947

[52] U.S. Cl.................................. 219/501; 219/505
[51] Int. Cl.².......................................... H05B 1/02
[58] Field of Search........... 219/490, 494, 497, 499, 219/501, 504, 505; 307/252 J, 291, 310

[56] References Cited
UNITED STATES PATENTS

| | | | |
|---|---|---|---|
| 3,452,214 | 6/1969 | Martin | 307/96 |
| 3,564,205 | 2/1971 | Tyler | 219/501 |
| 3,571,564 | 3/1971 | Welch | 219/501 |
| 3,780,263 | 12/1973 | Kuzyk | 219/501 |
| 3,818,247 | 6/1974 | Chambers et al. | 219/501 |
| 3,858,027 | 12/1971 | Phillips | 219/501 |

OTHER PUBLICATIONS
Millman & Taub "Pulse, digital, and switching waveforms" 1965, p. 5.

Primary Examiner—R. N. Envall, Jr.
Assistant Examiner—Fred E. Bell
Attorney, Agent, or Firm—Joseph E. Papin

[57] ABSTRACT

A control system for controlling a condition, such as temperature, to maintain that condition in a generally enclosed space near a selected condition value. The system has a condition responsive impedance in series with a selectable impedance across a regulated voltage source to provide a voltage divider network, the output of which reflects the instantaneous condition of the environmental space relative to a selected condition therefor. This output is supplied to a Schmitt trigger circuit having hysteresis characteristics sufficient to provide a stable operating mode for the control system, and the Schmitt trigger circuit output controls a means for changing the condition of the enclosed space. A manual mode selecting switch may be provided for inserting any of several different impedances in the series combination, and a timer may be provided to automatically switch between different impedances in the series combination as determined by elapsed time with respect to application of power to the circuit.

19 Claims, 3 Drawing Figures

CONTROL SYSTEM

BACKGROUND OF THE INVENTION

The present invention relates generally to control systems and in particular to those which may be utilized to control a certain condition in an enclosed space.

In the past, many different types of control systems were provided for regulating or controlling a certain condition, such as temperature for instance, in an enclosed space, such as an oven or the like. Some of these past control systems were, for the most part generally mechanical in nature having at least some of the disadvantageous or undesirable features normally attendant to mechanical devices. Others of these past control systems were, for the most part, solid state electronic devices.

Due to the vertically instantaneous reaction of control systems of the solid state type to condition changes, one of two general approaches was employed in prior art circuitry to limit cycling of the system components so as to provide a stable operating mode for the control system. For instance, one approach was to enable a means for changing a condition, such as temperature for instance, in an enclosed space, during only a portion of each cycle of alternating current supplied thereto and to vary the proportion of each cycle during which the condition changing means was enabled in response to a sensed temperature in the environmental space. The other of the two approaches employed in prior art circuitry to prevent undue cycling of the system utilizes some types of additional circuitry for causing a turn-on temperature to be different than a turn-off temperature thereby to insure that means for changing the condition in the enclosed space is energized for a reasonable length of time when such energization is indicated by the control system. In many prior art control systems, this latter scheme was implemented by providing a capacitor for creating a differential amplifier and discharging the capacitor each time a control element, such as a silicone controlled rectifier, was rendered conductive.

SUMMARY OF THE INVENTION

Among the several objects of the invention may be noted the provision of a control system for controlling certain condition in an enclosed space which overcomes at least some of the disadvantageous features of the prior art control systems as discussed in general hereinbefore; the provision of such control system utilizing solid state components having hysteresis characteristics sufficient to insure a stable system operating mode; the provision of such control system having an adjustable differential simplistically effected; the provision of such control system utilizing a low mass sensor and a fast acting thermal relay; the provision of such control system which may be easily simplistically adapted to expand logic control so as to incorporate additional functions, such as timing or special temperature controlled cycles; the provision of such control system having solid state components with the ability to perform several different functions or controls heretofore performed by a plurality of electromechanical devices; the provision of such control system having independently controllable or suitable selected temperatures and temperature differentials with respect to an enclosed space being regulated; and the provision of such control system which is simplistic in design, easily assembled or applied, and economically manufactured. Other objects and advantageous features of the invention will be in part apparent and in part pointed out hereinafter.

In general, a control system in one form of the invention has means for changing temperature in an enclosed space to maintain it generally near a selected value. In this control system, means is electrically energizable for enabling the temperature changing means, and means is provided for electrically indicating variations of the temperature in the enclosed space from the selected value. Bistable means is responsive to the indicating means and coupled to the enabling means for respectively effecting actuation and de-actuation of the temperature changing means when the temperature in the enclosed space varies from the selected value by one of a first predetermined amount in excess of the predetermined value and a second predetermined amount less than the predetermined value, and the bistable means is constituted by a Schmitt trigger circuit having output voltage versus input voltage hysteresis characteristics to limit cycling of the temperature changing means.

Also in general and in one form of the invention, a control system has means for changing an instantaneous temperature in an enclosed space to maintain it generally near a selected value. In this control system, means is electrically energizable for enabling the temperature changing means, and means is provided for electrically indicating variations in the instantaneous temperature from the selected value. The electrically indicating means includes a regulated voltage source, a temperature sensitive impedance in thermal communication with the enclosed space, a plurality of temperature selecting impedances, and means for selecting at least one of the temperature selecting impedances and for connecting the selected impedance in series with the temperature sensitive impedance across the voltage source. Bistable means is responsive to the voltage across one of the series connected impedances and coupled to the electrically energizable means to cause the temperature changing means to be enabled when the selected temperature exceeds the area temperature by a first predetermined amount and to be disabled when the area temperature exceeds the selected temperature by a second predetermined amount.

Further in general, a control system in one form of the invention has means for changing the temperature in an enclosed space to maintain it generally near a selected temperature. In this control system, means is provided for electrically indicating variations in the temperature $T_a$ in the enclosed space from the selected temperature $T_s$, and bistable means is responsive to the indicating means and coupled to the temperature changing means for enabling it when, for a preselected real number $K_1$, $[T_s - T_a] > K_1$, and for subsequently disabling it when, for a preselected real number $K_2$, $[T_a - T_s] > K_2$.

Timing means is effective upon the lapse of a selected time for selecting a new temperature for the enclosed space.

Still in general, a control system in one form of the invention is provided for maintaining temperature in an enclosed space generally near a selected value. In this control system, there is provided a regulated voltage source, and a voltage divider network includes at least a temperature sensitive impedance in thermal communication with the enclosed space, and an impedance which may be varied. A Schmitt trigger circuit has an output coupled to vary the temperature in the enclosed space and an input coupled to the voltage divider network, and the Schmitt trigger circuit has output voltage versus input voltage hysteresis characteristics to provide a stable operating mode for the control system.

Also in general and in one form of the invention, a control system has means for changing a condition in an enclosed space to maintain that condition generally near a selected condition value. In this control circuit, means for controlling the changing means includes a regulated voltage source, a voltage divider network having at least a condition responsive impedance in communication with the enclosed space, and an impedance which may be varied. A Schmitt trigger circuit has an output coupled to the changing means and an input coupled to the voltage divider network, and the Schmitt trigger circuit has output voltage versus input voltage hysteresis characteristics to provide a stable operating mode for the control system.

BRIEF DESCRIPTION OF THE DRAWINGS

Corresponding reference characters indicate corresponding parts throughout the several views of the drawings.

The following examples merely illustrate the present invention and are not to be construed as limiting in any manner.

DETAILED DESCRIPTION OF THE PREFERRED EMBODIMENTS

Figure 1:
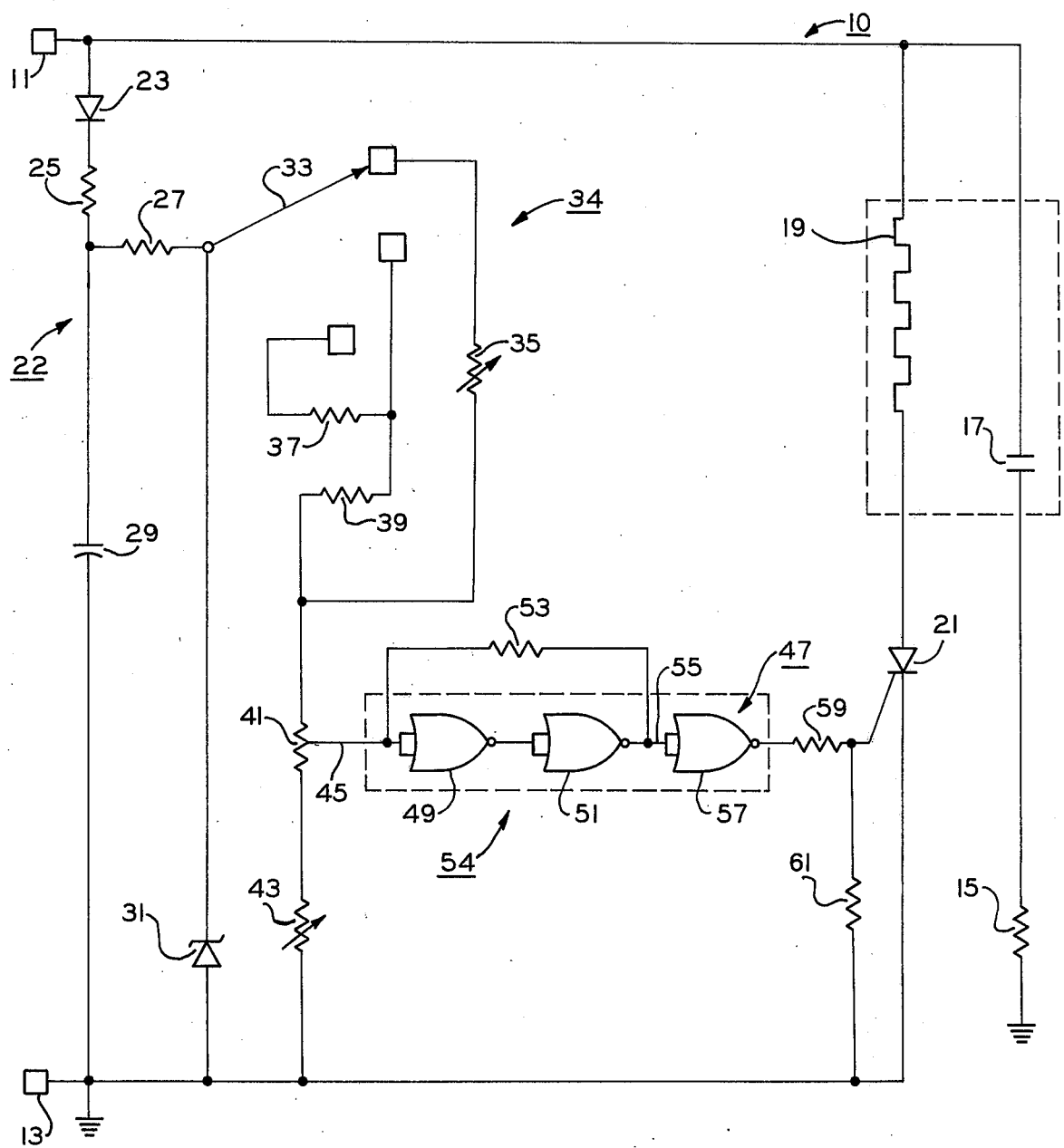
FIG. 1 is a schematic diagram illustrating a control system in one form of the invention.

Referring now to FIG. 1, there is shown a control system, indicated generally at 10, in one form of the invention. A source of power, such as a 120 volt alternating current source, may be applied across a pair of circuit terminals 11, 13 so as to be applied across a load, such as a heating device or coil 15 which may be disposed in an enclosed space, such as an oven or the like (not shown). Terminals 11, 13 are connected across coil 15 by way of a pair of relay contacts 17 across means, such as a thermal relay 19, for energizing the relay contacts by way of a switching device, such as a silicon controlled rectifier 21, and across a circuit indicated generally at 22, for converting the applied alternating current to direct current. Circuit 22 provides a source of regulated voltage and is generally constituted by a rectifying diode 23, a current limiting resistor 25, a voltage reducing resistor 27, a storage or filtering capacitor 29, and a zener diode 31. In this manner, a well regulated direct current voltage is supplied between a selectively operable switch arm 33 and ground. Switch arm 33 is a portion of a mode selecting switch, indicated generally at 34, to connect the regulated direct current voltage across any one of three resistors 35, 37, or 39, and the selected one of this resistor forms a series circuit with resistors 41 and 43. While other types of impedances may be employed within the scope of the invention, resistors are preferred if for no other reason than they are relatively inexpensive. In the position of switch arm 33 shown, the regulated voltage is across means, such as resistor 35, for adjustably selecting a predetermined or selected temperature at which it is desired to maintain the enclosed space, and this resistor may be continuously variable and calibrated to give an indicated temperature setting while a variable resistor 41 is basically utilized as a "trimmer" resistor for factory adjustment of the calibration of the temperature selecting resistor. Means, such as a resistor 43, for indicating instantaneous temperatures in the enclosed space functions as a temperature sensing or temperature responsive resistor having a positive temperature coefficient and is in thermal communication with the enclosed space at all times. Thus, for any selected position of switch arm 33 of mode selecting switch 34, a voltage dividing impedance network isi provided with the potential on a wiper arm 45 varying directly, but not necessarily linearly, with the instantaneous temperature being monitored in the enclosed space.

An integrated circuit chip 47, such as an RCA 4001, is provided having three NOR gates connected as simple inverting gates thereon. A first pair of inverting gates or circuits 49, 51 are concatenated and provided with a feedback impedance 53 to form a Schmitt trigger circuit, indicated generally at 54, where the output voltage versus input voltage hysteresis characteristics of the Schmitt trigger circuit, as illustrated in a somewhat exaggerated manner in FIG. 3, predeterminately limits cycling of system 10.

Figure 3:
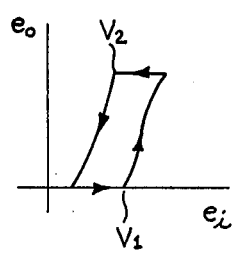
FIG. 3 is a graphical representation of the input voltage $e_i$ versus output voltage $e_o$ hysteresis characteristics of a Schmitt trigger circuit shown in FIGS. 1 and 2.

Referring briefly to FIG. 3, in conjunction with FIG. 1, input voltage $e_i$ represents the voltage at wiper arm 45 of variable resistor 41, and output voltage $e_o$ represents the voltage supplied on a line 55, as the input to an inverting circuit 57. Assuming that initially Schmitt trigger circuit 54 is in its logic 0 or low state, the voltage $e_i$ must be increased to $V_1$ whereupon an almost instantaneous transition to the logic 1 or high state occurs. Schmitt trigger circuit 54 remains in its logic 1 state until input voltage $e_i$ is reduced to $V_2$ whereupon the circuit again virtually instantaneously returns to its low state. The degree of hysteresis ($V_1 - V_2$) may be varied by varying a resistor 53 and functions to insure that the turn-on temperature differs from the turn-off temperature of system 10 with more hysteresis corresponding to a greater temperature differential. If the selected temperature is $T_s$ and the instantaneous temperature of the enclosed space being controlled is $T_a$, then coil 15 will be enabled when selected temperature $T_s$ exceeds instantaneous $T_a$ by a preselected real number $K_1$ and disabled when instantaneous temperature $T_a'$ (i.e. a different instantaneous temperature) exceeds selected temperature $T_s$ by a preselected real number $K_2$ which may equal $K_1$. More generally, a condition control system would be enabled when $[T_s - T_a] > K_1$ and subsequently disabled when $[T_a' - T_s] > K_2$ or $[T_a' - T_a] > K_1 + K_2$ where $K_1$ and $K_2$ are of the same order of magnitude. The output of Schmitt trigger circuit 54 is coupled by way of inverting circuit 57, and resistive network 59, 61 to the gate of a solid state switching device, such as silicon controlled rectifier 21.

If the enclosed space (not shown) was constituted by an oven of the electric, self-cleaning type, well known to the art, heat clean and pre-heat cycles would be integrated with or built into mode selecting switch 34 and heating element 15 would be energized by thermal relay 19 controlled by silicon controlled rectifier 21. The particular thermal relay chosen was a very fast acting device to overcome the normal overshoot problems generally found in ovens, however other control devices could clearly be used. In this same particular implementation, temperature responsive resistor 43 was designed to have a fast response to temperature change, by providing a hollow ceramic core of small mass onto which approximately 280 turns of 0.00175 inch diameter glass insulated Hytemco wire was wound thereby to provide resistance of about 1000 ohms at 70° faherenheit and a variation of approximately 4 ohms per degree faherenheit in a substantially linear manner over a wide range between about −100° faherenheit and about +1000° faherenheit. Other commercially available temperature sensitive resistors could of course be employed.

To illustrate the operation of the circuit of FIG. 1 in an electric oven, assume that arm 33 of mode select switch 34 is in the position shown with temperature selecting resistor 35 calling for a temperature below the instantaneous temperature of the oven. Under these circumstances, silicon controlled rectifier 21, will be non-conducting. If temperature selecting impedance 35, is now selectively changed to call for an increased instantaneous temperature or additional heat by increasing its impedance, the potential on line 45 decreases to, for example, voltage $V_2$ of FIG. 3. At this time Schmitt trigger circuit 54 changes state to its low or logic 0 status. Stated another way, increasing the impedance of resistor 35, causes a logic 0 to appear at the input of gate 49 thereby to provide a 1 logic at the output thereof and a logic 0 at the output of gate 51. Inversion effected by inverting gate 57 causes a logic 1 or high level to be passed to the gate of silicon controlled rectifier 21 turning or switching it on and allowing line current to flow through thermal relay 19 to energize heating element 15. As oven temperature increases, the impedance of resistor 43 increases driving the input to Schmitt trigger circuit 54 back toward its logic 1 state. When that voltage reaches voltage $V_1$ (as seen in FIG. 3), the high input to gate 49 causes a low input to gate 51, and a high logic or 1 output from gate 51 is subsequently inverted by inverter 57 to effect a low or logic 0 signal to the gate of silicon controlled rectifier 21 thereby to turn off that switch and de-energize heating element 15.

System 10 generally operates in basically the same manner for other positions of mode selecting switch 34. For example, heat cleaning impedance 37 may simply be a fixed resistor of relatively high value to insure a sufficiently high operating oven temperature during a cleaning cycle.

Numerous modifications of control system 10 of FIG. 1 are possible. For example, deletion of inverting gate 57 would result in a control system suitable for, for example, an air conditioning device. Similarly, substitution of an negative temperature coefficient impedance for impedance 43 would provide for control over a cooling rather than a heating environment with respect to the control system of FIG. 1. It is contemplated that the foregoing changes and substitution of components, as well as others, as may be made by those skilled in the art are within the scope of the invention.

Figure 2:
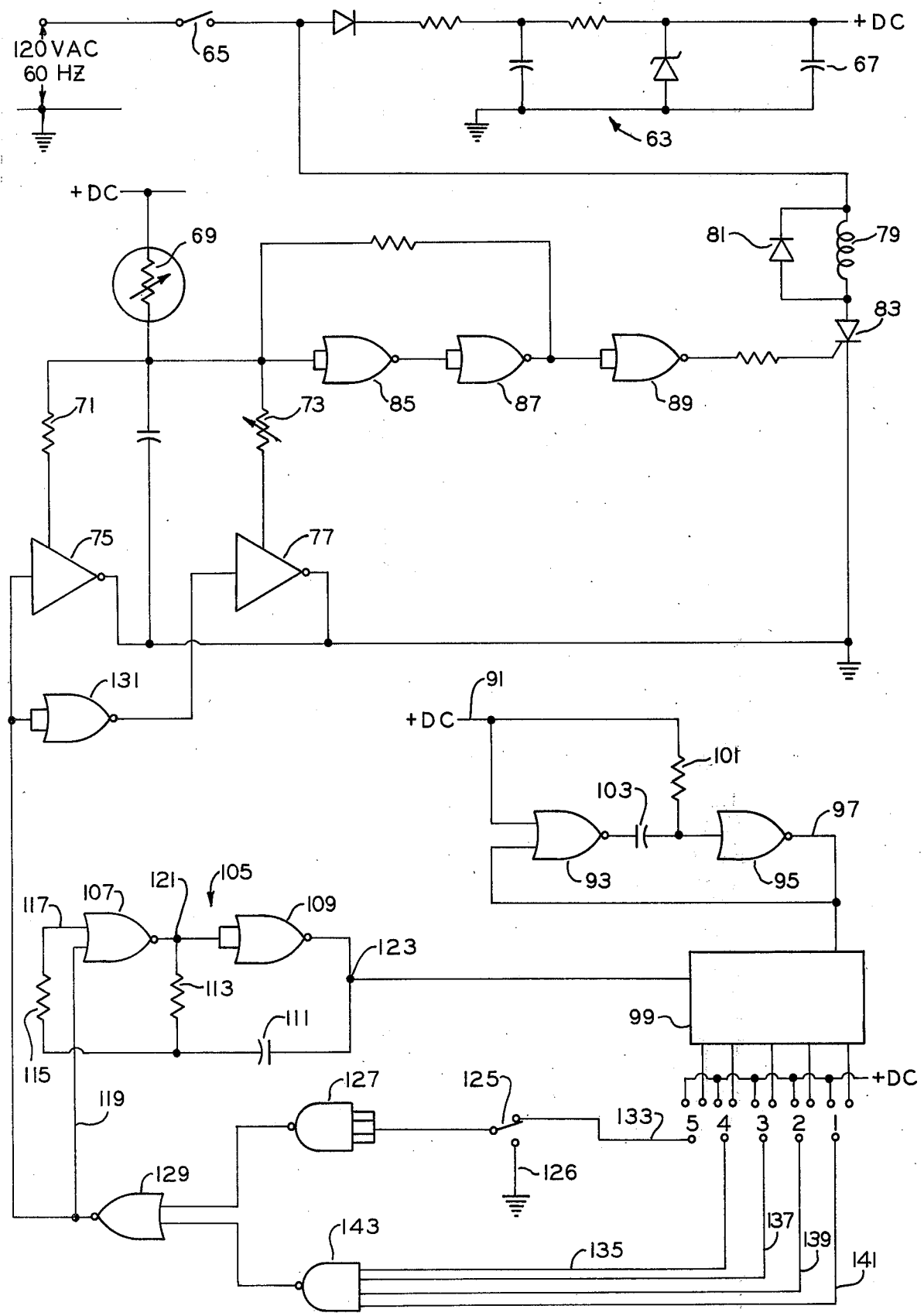
FIG. 2 is a schematic diagram illustrating a control system in one form of the invention which may include several variations on the control system of FIG. 1.

Referring now to FIG. 2, another control system, indicated generally at 60, having many of the same component parts functioning in generally the same manner as those previously discussed with respect to control system 10. Numerous similarities between the disclosures of FIGS. 1 and 2 will be apparent and some will be discussed hereinafter only insofar as it aids in understanding the differences between the disclosures; however, it may be noted that control system 60, while having some advantageous features analogous to those of control system 10, also has other salient features of its own.

In control system 60, a regulated voltage source 63 is also provided differing from that indicated generally at 22 in FIG. 1 only in the inclusion of an on-off switch 65 and a second capacitor 67 which operates to provide a more ripple free regulated voltage and or to reduce the size of the filter capacitor corresponding to that indicated at 29 in FIG. 1. As noted above, a negative temperature coefficient temperature responsive impedance 69 is provided for thermal communication with the instantaneous temperature in the enclosed space. Resistor 69 forms one leg of a voltage divider network in conjunction with either a resistor 71 or a temperature selecting resistor 73 depending upon the status of a pair of transmission gates or switches 75, 77 which, as discussed hereinafter, function as a replacement for mode selecting switch 34 of FIG. 1.

The enclosed space or oven of FIG. 2 may be assumed to be gas fired having a gas valve in the form of an energizable solenoid valve 79 with a turn-off transient diode 81 to provide flow path for current when a silicon controlled rectifier 83 is turned or switched off. Assuming gas valve 79 to be in its off position and switches 75, 77 in conducting states effective to couple variable temperature selecting resistor 73 in the voltage divider circuit, when impedance of resistor 73 is decreased to a value necessary to provide a logic 0 input to a gate or inverter 85, a logic 0 output will be provided from a gate or inverter 87 which, after subsequent inversion by a gate 89, will enable a silicon controlled rectifier 83 to effect current flow in the winding of solenoid operated gas valve 79 opening it to supply fuel for ignition. As the instantaneous temperature in the enclosed space increases, the resistance of negative temperature coefficient impedance 69 drops until the potential at the input of gate 85 is sufficiently high to switch a Schmitt trigger circuit 90 generally constituted by gates 85, 87 back to its logic 1 state thereby shutting off silicon controlled rectifier 83 and cutting off the flow of fuel. Resistor 71 is a hold temperature impedance, and rather than manually switching between temperature selective impedance 73 and hold temperature impedance 71 when the cooking operation is complete and its desired to hold the foods at, for example, 170 degrees faherenheit, a timing circuit is provided to automatically effect this transition.

When switch 65 is closed energizing the regulated voltage source 63, a logic 1 or high level appears on a line 91, causing the output of a NOR gate 93 to go to its low level or logic 0. The input to a NOR gate 95, which functions here as an inverter, is also low thus providing a logic 1 or high output signal on a line 97 which is coupled to a reset to zero input on a binary counter 99. Depending on the respective values of a resistor 101 and a capacitor 103, the capacitor will charge to a point where, although a low or logic 0 output appears from NOR gate 93, the voltage input to NOR gate 95 is sufficiently high to change the state of that gate and remove the reset signal to counter 99. Counter 99 receives timing signals at a predetermined repetition rate from an alternating signal source 105 thereby to repetitively increment the counter. Signal source 105 functions as a multivibrator oscillator having a pair of NOR gates 107 and 109 coupled together with a feedback path by way of a capacitor 111 and a pair of resistors 113, 115. Oscillator 105, as illustrated, may provide a generally square wave having a period of between about two and three seconds depending upon the values of capacitor 111 and resistors 113, 115. Assume initially that the level on a line 117 is at logic 0 or a low level as is that on a line 119. Under these circumstances, a junction 121 goes high providing an output at a terminal 123, which is low. If capacitor 111 is not charged at this time, current will flow through resistor 113 to charge the capacitor, and little current will flow through resistor 115 until the charge on the capacitor has built or increased to some substantial value. As the charge in capacitor 111 builds, more and more current flows through resistor 115 eventually raising the potential on line 117 to the logic 1 state which causes terminal 121 to go to its logic 0 condition providing a logic 1 at output terminal 123. The cylic operation continues providing the desired square wave to counter 99.

The last five stages of counter 99 are brought out to push button selector switches which may be depressed singly or in combination to provide variable time setting capability. The size of counter 99 and the repetition rate of oscillator 105 may be selected so that these last five stages correspond to a ¼ hour, a ½ hour, and 1, 2, and 4 hour time periods, respectively. Thus the combination of push button switches allows for a time range from 15 minutes to 7 hours and 45 minutes.

To understand the interconnection of the push buttons of counter 99 and the logic circuitry, system 60 is most easily traced beginning at a manual-timed selector switch 125 which, in the position shown, is for timer operation but which may be grounded to allow for normal manual operation of the oven. If switch 125 is coupled to ground, as indicated at 126, all of the inputs to a NAND gate 127 are low or at logic 0 status providing a high output or logic 1 status to one input of a NOR gate 129 which in turn provides a low or logic 0 output both to line 119 (the oscillator will continue to function) and to the input of an NOR gate 131. NOR gate 131 functions as an inverter to supply a relatively high or enabling output to transmission gate 77 for grounding one end of temperature selecting resistor 73 and allowing the circuit to operate, as discussed previously. When the output of NOR gate 129 is logic 0 or low, transmission gate 75 is blocked, and resistor 71 is not a part of the voltage divider network.

If switch 125 is turned to its upper position, as illustrated in FIG. 2, and none of push buttons 1 through 5 are yet depressed, each of a plurality of lines 133, 135, 137, 139, and 141, are coupled to direct current voltage source 63 thus supplying a high input to each of the inputs for NAND gates 127, 143. Thus, the condition for each NAND gate 127, 143 is met, and each provides a logic 0 output producing a logic 1 on the output of NOR gate 129 to both disable oscillator 105 by way of a high signal on line 119, to enable holding transmission gate 75. Enabling of holding transmission gate 75 connects hold temperature setting resistor 71 to ground, and by way of inverter 131, opens transmission gate or switch 77 taking variable temperature selecting resistor 73 out of the voltage dividing network.

If, for example, push button number 2 of counter 99 had been depressed removing the positive direct current signal from line 139, not all of the conditions for NAND gate 143 would have been met. The output of NAND gate 143 would have been a logic 1 which, in turn, would cause the output of NOR gate 129 to be a logic 0, and the oven would have operated based on the value set on temperature selecting resistor 73 until such time as line 139 went to the positive voltage value corresponding to a logic 1 state. This would occur when the stage of counter 99 corresponding to push-button number 2 thereof was enabled due to the counter having counted up to that stage. If more than one push-button of counter 99 is depressed, the oven will continue cooking until each of those stages goes high indicating that the corresponding count has been reached.

Thus, while the present invention has been described with respect to a specific preferred embodiment numerous modifications will suggest themselves to those of ordinary skill in the art. For example, features may be rather freely interchanged between control systems 10, 60 of FIGS. 1 and 2, and specifically FIG. 2 might incorporate a manual selecting switch in addition to the timing mode selection function shown. Further, more complicated logic circuitry might be provided to allow the timer to control several different functions within the oven. It is contemplated that the foregoing suggested modification for control system 60, as well as others apparent to those having ordinary skill in the art, are within the scope of the invention.

From the foregoing, it is now apparent that control systems 10, 60 have been provided meeting the objects and advantageous features therefor set out hereinbefore, as well as others, and that changes as to the precise arrangements, connections, shapes and details of the component included in the control systems may be made by those having ordinary skill in the art without departing from the spirit and scope of the invention which is defined by the claims which follow.

What I claim as new and desire to secure by Letters Patent of the United States is:

1. A control system having means for changing temperature in an enclosed space to maintain it generally near a selected value comprising;

means electrically energizable for enabling the temperature changing means;

means for electrically indicating variations of the temperature in the enclosed space from the selected value; and bistable means responsive to the indicating means and coupled to the enabling means for respectively effecting actuation and de-actuation of the temperature changing means when the temperature in the enclosed space varies from the selected value by one of a first predetermined amount in excess of the predetermined value and a second predetermined amount less than the predetermined value, the bistable means being constituted by a Schmitt trigger circuit having output voltage versus input voltage hysteresis characteristics to limit cycling of the temperature changing means.

2. A control system as set forth in claim 1, wherein the Schmitt trigger circuit comprises first and second concatenated inverting circuits, and a feedback inpedance, the value of which determines the degree of hysteresis in the trigger circuit.

3. A control system as set forth in claim 1, wherein the indicating means includes means operable generally for selecting the selected value of the temperature in the enclosed space.

4. A control system having means for changing an instantaneous temperature in an enclosed space to maintain it generally near a selected value comprising;

means electrically energizable for enabling the temperature changing means;

means for electrically indicating variations in the instantaneous temperature from the selected value including a regulated voltage source, a temperature sensitive impedance in thermal communication with the enclosed space, a plurality of temperature selecting impedances, and means for selecting at least one of the temperature selecting impedances and for connecting the selected impedance in series with the temperature sensitive impedance across the voltage source; and bistable means responsive to the voltage across one of the series connected impedances and coupled to the electrically energizable means to cause the temperature changing means to be enabled when the selected temperature exceeds the area temperature by a first predetermined amount and to be disabled when the area temperature exceeds the selected temperature by a second predetermined amount.

5. A control system as set forth in claim 4, wherein the selecting means comprises a manually operable mode selecting switch the number of temperature setting impedances including a manually variable temperature select impedance, a fixed preheat impedance, and a fixed heat-clean impedance.

6. A control system as set forth in claim 4, wherein the plurality of temperature setting impedance includes a manually variable temperature selecting impedance, a fixed pre-heat impedance, and a fixed heat clean impedance.

7. A control system as set forth in claim 4, wherein the selecting means comprises an alternating signal source having a predetermined repetition rate, counting means responsive to the signal source to repetitively increment for providing an output signal upon reaching a selectable count, and gate means responsive to the output signal of the counting means for disconnecting one temperature setting impedance and substituting therefore in the series circuit another of the plurality of temperature setting impedances.

8. A control system as set forth in claim 7 wherein the selecting means further comprises means for resetting the counting means to an initial state each time electrical energy is applied to the system.

9. A control system as set forth in claim 7, wherein the plurality of temperature setting impedances includes a manually variable temperature select impedance and a fixed holding temperature impedance.

10. A control system having means for changing the temperature in an enclosed space to maintain it generally near a selected temperature comprising;

means for electrically indicating variations in the temperature $T_2$ in the enclosed space from the selected temperature $T_s$;

bistable means responsive to the indicating means and coupled to the temperature changing means for enabling it when, for a preselected real number $K_1$, $[T_2 - T_2] > K_1$, and for subsequently disabling it when, for a preselected real number $K_2$, $[T_a - T_s] > K_2$; and timing means effective upon the lapse of a selected time for selecting a new temperature for the enclosed space.

11. A control system as set forth in claim 10, wherein the indicating means comprises a regulated voltage source, a temperature sensitive impedance in thermal communication with the enclosed space, and a plurality of temperature setting impedances.

12. A control system as set forth in claim 11, wherein the timing means include means for selecting one of the temperature setting impedances and for connecting the one selected impedance in series with the temperature sensitive impedance across the voltage source, the bistable means being responsive to the voltage across one of the series connected impedances.

13. A control system as set forth in claim 12, wherein the timing means comprises an alternating signal source having a predetermined repetition rate, counting means responsive to the signal source to repetitively increment for providing an output signal upon reaching a selectable count, and gate means responsive to the output signal of the counting means for disconnecting the one temperature setting impedance and substituting therefore in the series circuit another of the temperature setting impedances.

14. A control system as set forth in claim 13, further comprising means for resetting the counting means to an initial state each time electrical energy is applied to the system.

15. A control system as set forth in claim 13, wherein the temperature setting impedances include at least a manually variable temperature impedance, and a fixed holding temperature impedance.

16. A control system for maintaining temperature in an enclosed space generally near a selected value comprising;

a regulated voltage source;

a voltage divider network including at least a temperature sensitive impedance in thermal communication with the enclosed space, and an impedance which may be varied; and a Schmitt trigger circuit having an output coupled to vary the temperature in the enclosed space and an input coupled to the voltage divider network, the Schmitt trigger circuit having output voltage versus input voltage hysteresis characteristics to provide a stable operating mode for the control system.

17. A control system as set forth in claim 16, wherein the Schmitt trigger circuit comprises first and second concatenated inverting circuits, and a feedback impedance the value of which determines the degree of hysteresis in the trigger circuit.

18. A control system having means for changing a condition in an enclosed space to maintain that condition generally near a selected condition value comprising means for controlling the changing means including a regulated voltage source, a voltage divider network having at least a condition responsive impedance in communication with the enclosed space, and an impedance which may be varied, and a Schmitt trigger circuit having an output coupled to the changing means and an input coupled to the voltage divider network, the Schmitt trigger circuit having output voltage versus input voltage hysteresis characteristics to provide a stable operating mode for the control system.

19. A control system as set forth in claim 18, wherein the Schmitt trigger circuit comprises first and second concatenated inverting circuits, and a feedback impedance the value of which determines the degree of hysteresis in the trigger circuit.

* * * * *

UNITED STATES PATENT OFFICE
CERTIFICATE OF CORRECTION

PATENT NO. : 3,937,922
DATED : February 10, 1976
INVENTOR(S) : David C. Hamstra

It is certified that error appears in the above-identified patent and that said Letters Patent are hereby corrected as shown below:

Col. 9, line 55, delete "$T_2$" and insert --$T_a$--.

Col. 9, line 60, delete "$[T_2-T_2]$" and insert --$[T_s-T_a]$--.

Signed and Sealed this

Seventh Day of September 1976

[SEAL]

Attest:

RUTH C. MASON
*Attesting Officer*

C. MARSHALL DANN
*Commissioner of Patents and Trademarks*